(12) United States Patent
Cornell et al.

(10) Patent No.: US 6,698,842 B1
(45) Date of Patent: Mar. 2, 2004

(54) DUMP TRUCK END GATE LOCKING SYSTEM

(76) Inventors: Brent Loren Cornell, Box 12, Site 16, R.R. #4, Red Deer, Alberta (CA), T4N 5E4; Dwayne Howard Cornell, #59 Parkland Acres, Lacombe, Alberta (CA), T4L 1T1

( * ) Notice: Subject to any disclaimer, the term of this patent is extended or adjusted under 35 U.S.C. 154(b) by 0 days.

(21) Appl. No.: 09/627,274

(22) Filed: Jul. 28, 2000

(30) Foreign Application Priority Data

Jul. 30, 1999 (CA) .............................................. 2279448

(51) Int. Cl.$^7$ ................................................. B60P 1/00
(52) U.S. Cl. ................................. 298/23 M; 298/23 R
(58) Field of Search ........................... 298/23 M, 23 S, 298/23 R; 296/56; 292/267, 274, 298

(56) References Cited

U.S. PATENT DOCUMENTS

| | | | | |
|---|---|---|---|---|
| 2,237,838 A | * | 4/1941 | McClirl ................... | 298/23 M |
| 4,109,963 A | * | 8/1978 | Sieving et al. ........... | 298/23 M |
| 5,823,630 A | * | 10/1998 | Graham ................. | 298/23 M X |
| 5,890,770 A | * | 4/1999 | Palmberg, Jr. ........ | 298/23 M X |

FOREIGN PATENT DOCUMENTS

DE    4205046 A1  *  8/1993  .............. 298/23 M

* cited by examiner

*Primary Examiner*—Stephen T. Gordon
(74) *Attorney, Agent, or Firm*—Christensen O'Connor Johnson Kindness PLLC

(57) ABSTRACT

A dump truck end gate locking system includes a dump truck having a chassis and a cargo box which pivots between a transport position and a dumping position. The cargo box has an end gate. A sensor is provided for sensing when the cargo box is in the transport position. A locking member is provided having a locked position engaging the end gate and an unlocked position disengaged from the end gate. A drive mechanism for the locking member is coupled to the sensor. The drive mechanism moves the locking member to the locked position to secure the end gate when the sensor indicates the cargo box is in the transport position. The drive mechanism moves the locking member to the unlocked position to release the end gate when the sensor indicates the cargo box has moved from the transport position to assume a dumping position.

5 Claims, 7 Drawing Sheets

DUMP TRUCK END GATE LOCKING SYSTEM

FIELD OF THE INVENTION

The present invention relates to a dump truck end gate locking system.

BACKGROUND OF THE INVENTION

A dump truck has a cargo box with a pivotally mounted end gate. The end gate pivots about a substantially horizontal pivot axis defined by pivot pins positioned on opposed sides adjacent a top peripheral edge of the end gate. Locks are provided to maintain the end gate in a closed position during transport. Problems arise if an operator of the dump truck forgets to either lock the end gate prior to loading or unlock the end gate prior to tilting the cargo box. If the operator loads without locking the end gate, material accumulated in the cargo box prevents the end gate from being placed in the locking position. This requires material to be manually removed from the cargo box adjacent the end gate in order to close and lock the end gate. If the operator tilts the cargo box without having unlocked the end gate, the weight of material against the end gate causes material to spill from the cargo box in an uncontrolled manner when the end gate is eventually opened.

SUMMARY OF THE INVENTION

What is required is a dump truck end gate locking system which will reduce or eliminate these problems from occurring.

According to the present invention there is provided a dump truck end gate locking system which includes a dump truck having a chassis and a cargo box pivotally mounted to the chassis for pivotal movement about a first substantially horizontal pivot axis between a substantially horizontal transport position and an inclined dumping position. The cargo box has an end gate pivotally mounted for pivotal movement about a second substantially horizontal pivot axis. A sensor is mounted to either the chassis or the cargo box for sensing when the cargo box is in the transport position. At least one movable locking member is mounted to the cargo box. The locking member has a locked position engaging the end gate and an unlocked position disengaged from the end gate. A drive mechanism is provided for the locking member coupled to the sensor. The drive mechanism moves the locking member to the locked position to secure the end gate when the sensor indicates the cargo box is in the transport position. The drive mechanism moves the locking member to the unlocked position to release the end gate when the sensor indicates the cargo box has moved from the transport position to assume a dumping position.

The dump truck end gate locking system, as described above, automatically locks and unlocks the end gate depending upon the position of the cargo box. This eliminates the possibility of human error. In the absence of mechanical failure the end gate will be locked when it should be locked and unlocked when it should be unlocked.

Once the teachings of the invention are understood, there are a number of different mechanisms that can be used to sense the position of the cargo box and to lock the end gate. A preferred embodiment of the dump truck end gate locking system will be hereinafter described.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The preferred embodiment, a dump truck end gate locking system, will now be described with reference to FIGS. 1 through 7.

Figure 1:
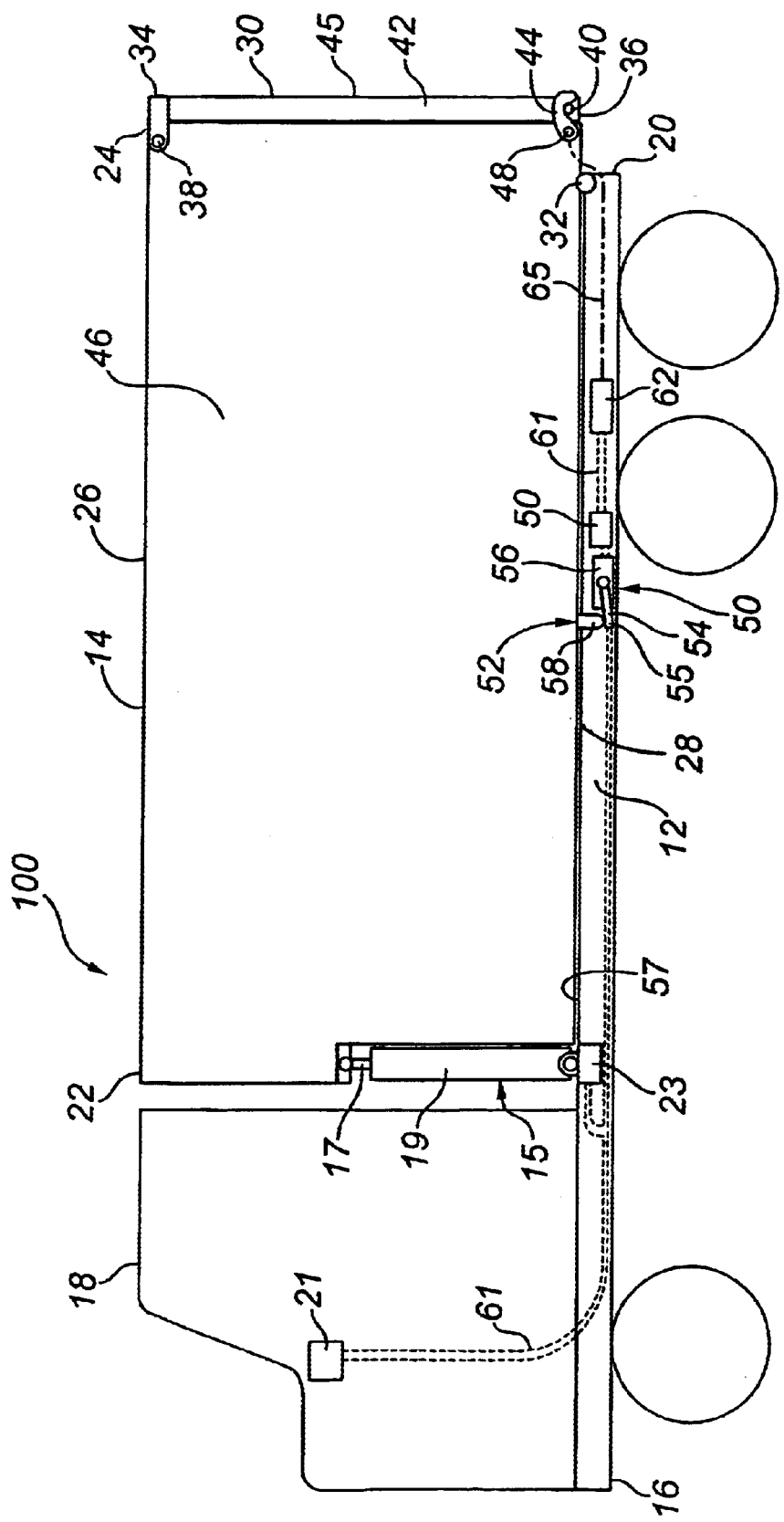
FIG. 1 is a side elevation view of a dump truck constructed in accordance with the teachings of the present invention, with cargo box in a transport position.
Figure 3:
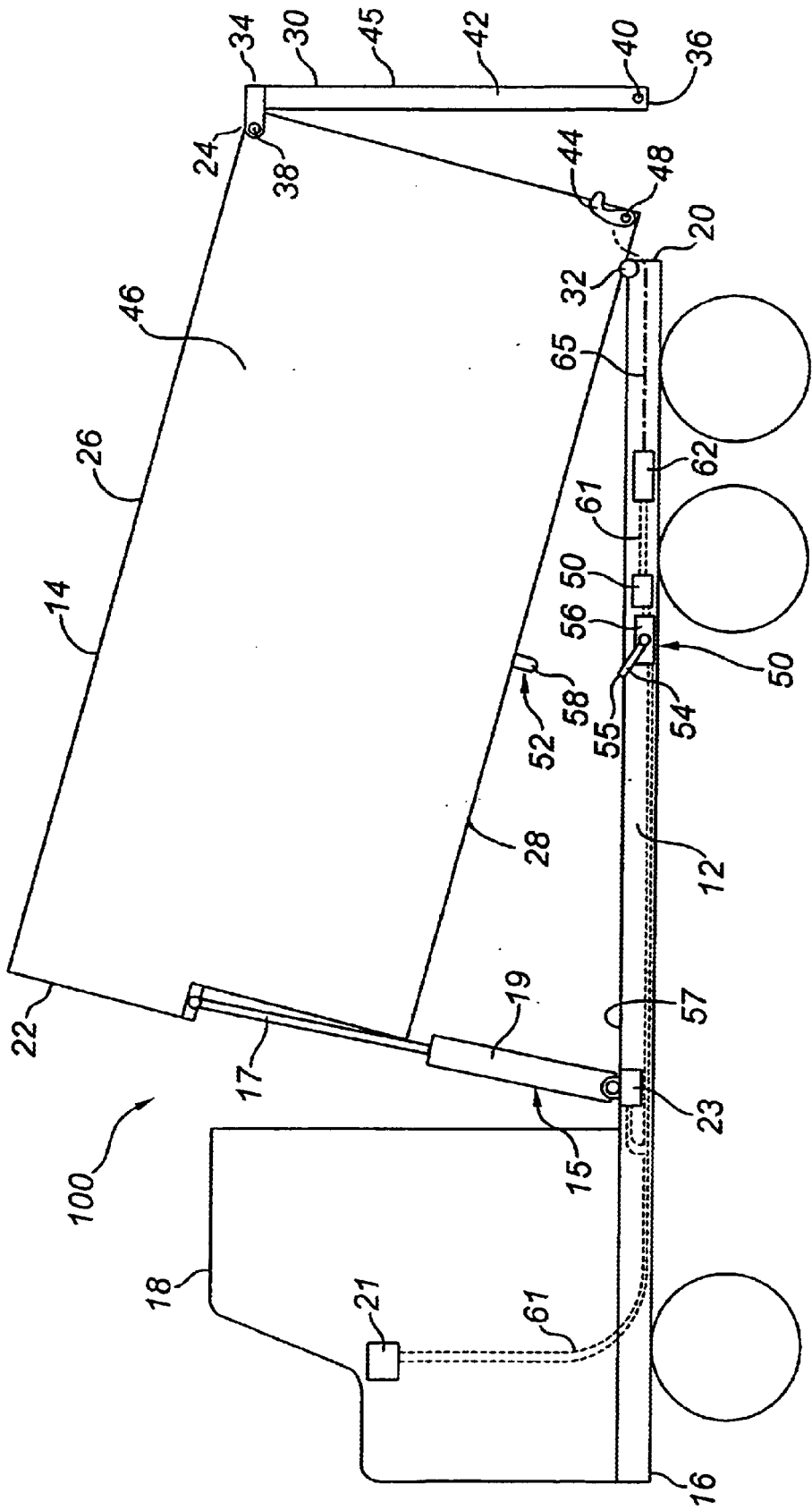
FIG. 3 is a side elevation view of the dump truck illustrated in FIG. 1, with cargo box in a dumping position.

Referring to FIGS. 1 and 3, the dump truck end gate locking system comprises, in combination, a sensor 50 and an actuator 52. Sensor 50 is mounted on a chassis 12 of a dump truck 100, and actuator 52 is mounted on a cargo box 14 of dump truck 100. Sensor 50 is activated to a "closed" setting when engaged by actuator 52, as illustrated in FIG. 1, and is activated to an "open" setting when disengaged from actuator 52, as illustrated in FIG. 3.

Chassis 12 of dump truck 100 has a first end 16 at which is mounted an operator's cab 18, and a second end 20 remote from operator's cab 18. Cargo box 14 has a closed end 22, an unloading end 24, a top 26 and a bottom 28. An end gate 30 is provided that can cover substantially all of unloading end 24 of cargo box 14. Sensor 50 detects that cargo box 14 directly overlies chassis 12 when actuator 52 engages sensor 50.

Cargo box 14 is pivotally moveable by means of a hydraulic mechanism 15 which includes a piston 17 pivotally secured to closed end 22 of cargo box 14 and a cylinder 19 is pivotally secured at an opposite end to chassis 12 behind cab 18. Hydraulic mechanism 15 is actuated by a signal from a control box 21 in cab 18 to an actuator 23 secured to chassis 12 to move between an extended position, illustrated in FIG. 3, and a contracted position, illustrated in FIG. 1. Control box 21 has a first setting for a signal to move hydraulic mechanism 15 to the contracted position, a second setting for a signal to move hydraulic mechanism 15 to the extended position, and a third override setting to be described hereinafter. Hydraulic mechanism 15 is used to pivotally move cargo box 14 between a transport position, illustrated in FIG. 1, and an unloading position, illustrated in FIG. 3. Cargo box 14 moves pivotally about first pivots 32 at bottom 28 adjacent to unloading end 24 of cargo box 14, said first pivots 32 forming a substantially horizontal axis at second end 20 of chassis 12. End gate 30 has a pivot end 34 and a locking end 36. End gate 30 is secured at pivot end 34 by means of second pivots 38 to unloading end 24 at top 26 of cargo box 14. Second pivots 38 form a substantially horizontal axis about which end gate 30 moves pivotally between a closed position, illustrated in FIG. 1, and an open position, illustrated in FIG. 3. A pin 40 is at locking end 36 of each of opposed sides 42 of end gate 30. A pivoting hook 44 is at each of opposed sides 46 at unloading end 24 at bottom 28 of cargo box 14. Each pivoting hook 44 moves pivotally about a third pivot 48 between a secured position engaging pins 40, illustrated in FIGS. 1 and 6, and a release position disengaged from pins 40, illustrated in FIGS. 3 and 7. Movement of pivoting hook 44 between the release position and the secured position is controlled by an electronic signal from sensor 50, as will hereinafter be described.

Figure 5:
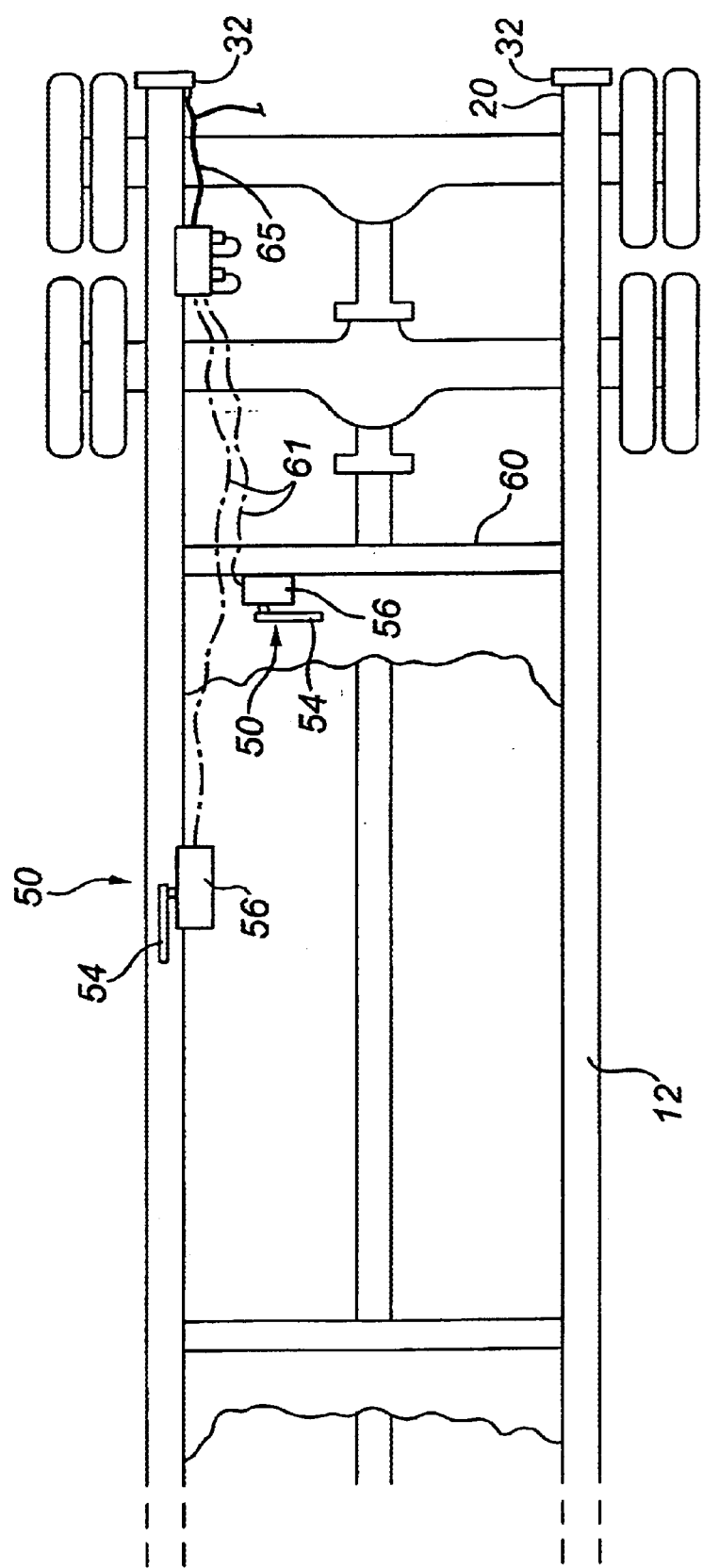
FIG. 5 is a top plan view of the chassis for the dump truck illustrated in FIGS. 1 and 3.

Referring to FIG. 5, a preferred type of sensor 50 is in the form of a plunger 54 and a plunger activated switch 56 mounted to chassis 12. A second sensor 50 is optionally mounted to a cross member 60 of chassis 12. Referring to FIG. 3, when actuator 52 is disengaged from sensor 50, a remote end 55 of plunger 54 extends above a top surface 57 of chassis 12. Referring to FIGS. 1 and 3, actuator 52 is in the form of an actuator post 58 depending from bottom 28 of cargo box 14. Referring to FIG. 1, when cargo box 14 is in the transport position, actuator post 58 engages plunger 54. Plunger 54 is depressed below top surface 57 of chassis 12 and switch 56 is activated to the "closed" setting. Referring to FIG. 3, when cargo box 14 is in the unloading position, actuator post 58 is disengaged from plunger 54 and switch 56 is activated to an "open" setting.

Figure 2:
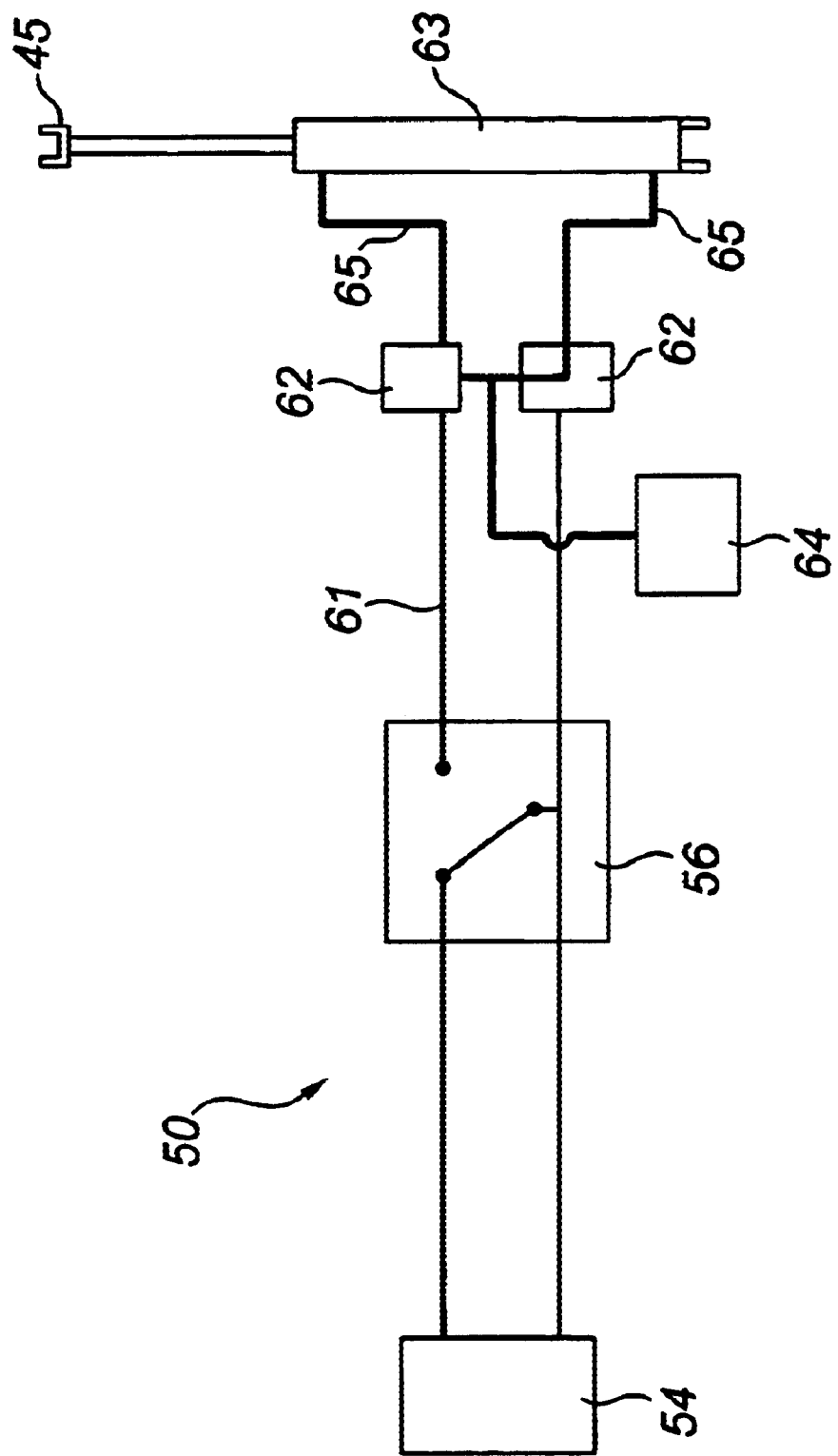
FIG. 2 is a block diagram of the dump truck illustrated in FIG. 1, when cargo box in the transport position.
Figure 4:
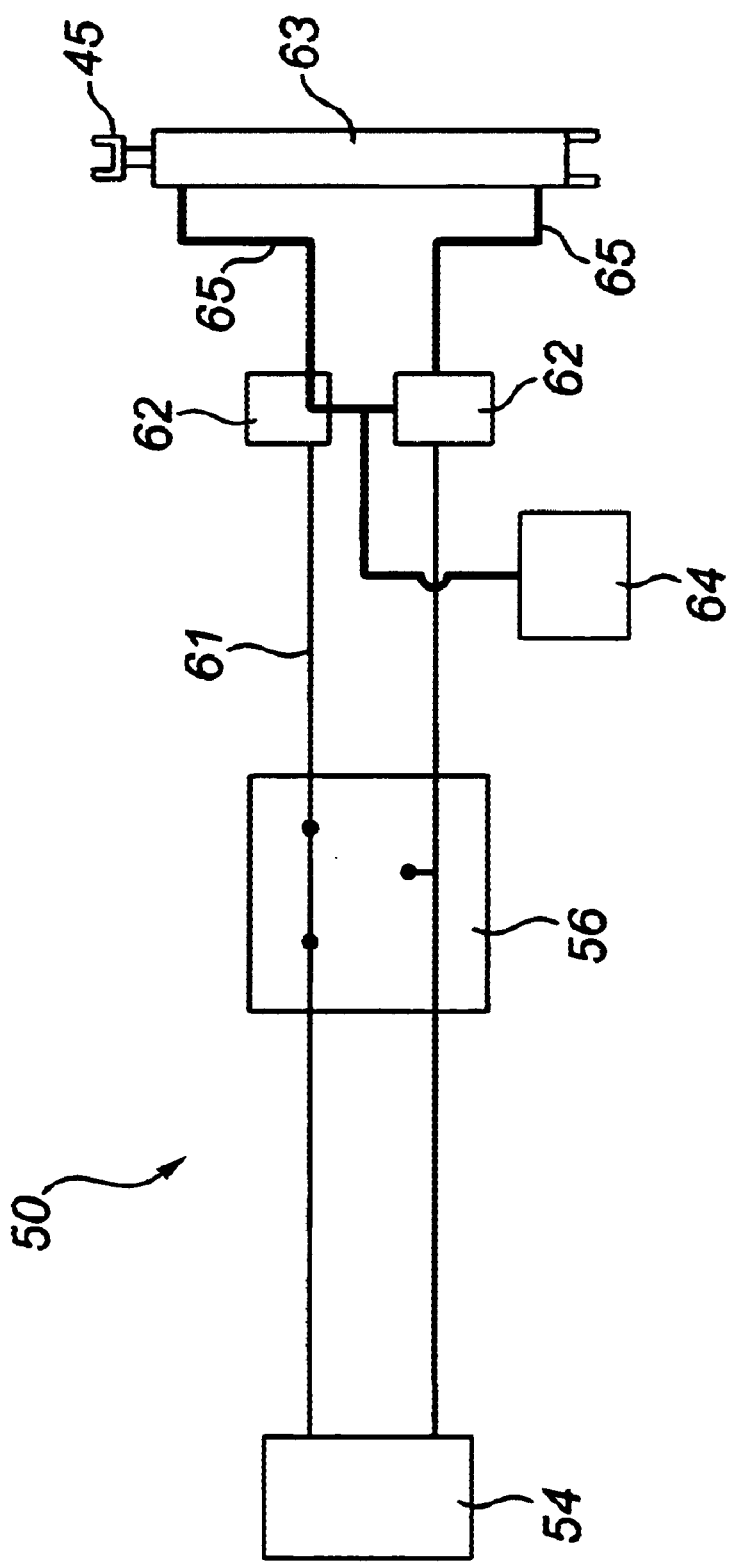
FIG. 4 is a block diagram of the dump truck illustrated in FIG. 3, when cargo box in the dumping position.
Figure 6:
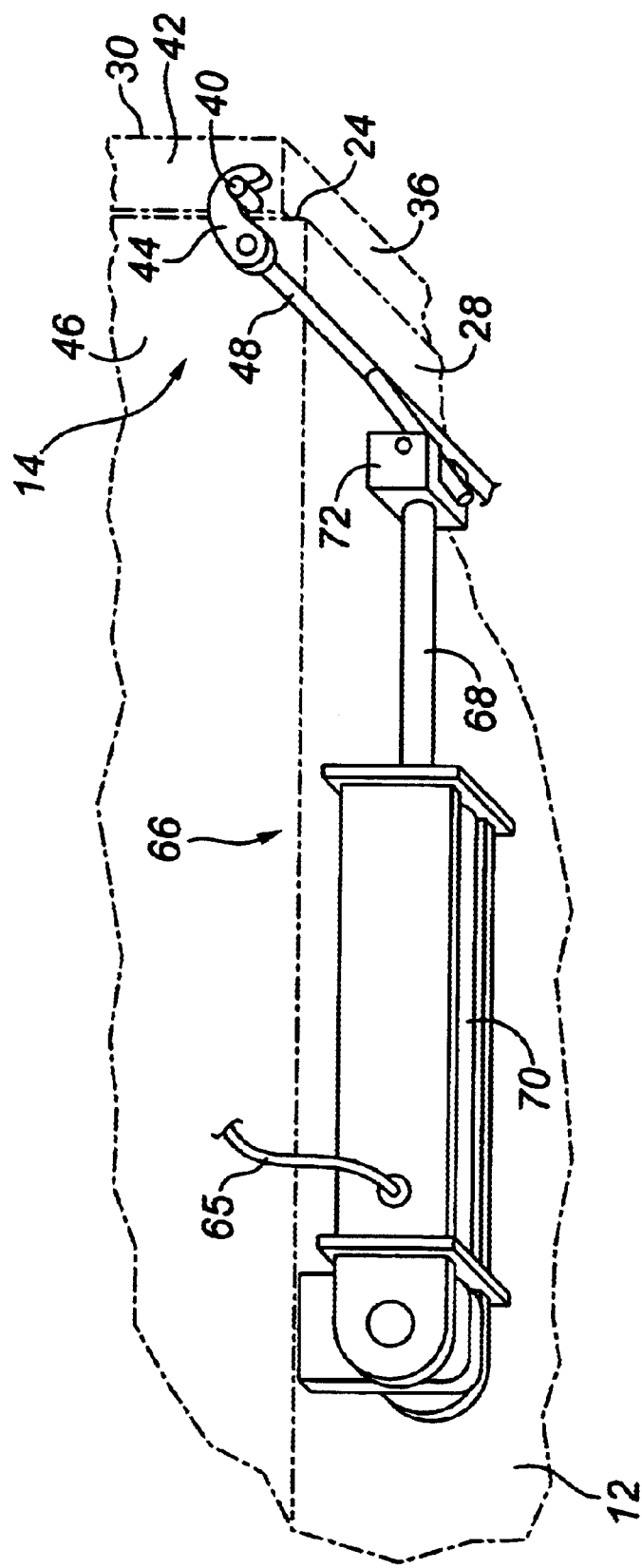
FIG. 6 is a perspective view of the drive mechanism for the pivoting pins when the end gate of the cargo box is locked in the closed position.
Figure 7:
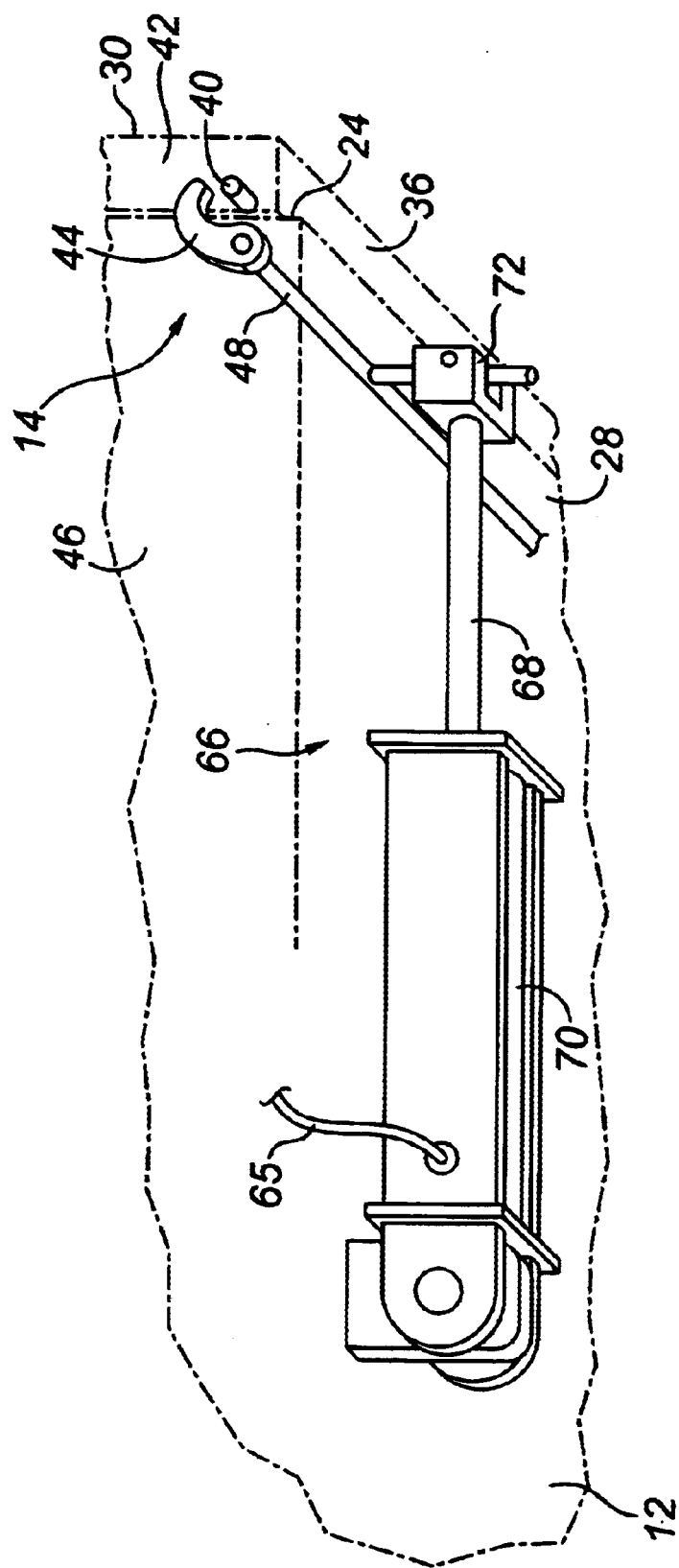
FIG. 7 is a perspective view of the drive mechanism illustrated in FIG. 6 when the pivoting pins are in the open position.

Referring to FIGS. 2 and 4, a pair of limiter switches 45 are each coupled to sensor 50 by means of an electrical circuit 61. Solenoids 62 activate drive mechanisms 63 for limiter switches 45 powered by compressed air 64 through compressed gas lines 65. Referring to FIG. 2, solenoids 62 actuate limiter switches 45 that in turn cause a ram 66 to cause pivoting hooks 44 to move to the locked position to secure end gate 30, as illustrated in FIG. 6, when sensor 50 is in the "closed" setting because cargo box 14 is in the transport position, illustrated in FIG. 1. Ram 66 includes a piston 68 extending from a cylinder 70, powered by compressed air via a compressed air line 65. A remote end 72 of piston 68 is couple via pivot 48 to pivoting hooks 44. Referring to FIG. 6, when remote end 72 of piston 68 is withdrawn toward cylinder 70, pivoting hook 44 engages pin 40. Referring to FIG. 7, when remote end 72 of piston 68 is distanced from cylinder 70, pivoting hook 44 is disengaged from pin 40. Referring to FIG. 4, solenoids 62 move limiter switches 45, which in turn actuate movement of rams 66 to move pivoting hooks 44 to the unlocked position to release end gate 30, as illustrated in FIG. 7, when sensor 50 is in the "open" setting because cargo box 14 has moved from the transport position to the unloading position, illustrated in FIG. 3.

Referring to FIGS. 1 and 3, control box 21 is connected by electrical circuit 61 to actuators 23 for hydraulic mechanism 15 and to solenoids 62. Referring to FIG. 1, when cargo box 14 is to be loaded, said cargo box 14 must be moved to the transport and end gate 30 must be securely closed closely covering unloading end 24 of cargo box 14. A signal is sent from control box 21 to actuator 23 to cause hydraulic mechanism 15 to move to the contracted position. As cargo box 14 reaches the transport actuator post 52 engages sensor 50. Referring to FIG. 2, a signal is thereby caused to be sent from switch 56 to solenoids 62, and limiter switch 45 actuates movement of rams 66 to move pivoting hooks 44 to the secured position, illustrated in FIGS. 1 and 6. Pivoting hooks 44 engage pins 40 at locking end 36 of end gate 30, as illustrated in FIG. 6, thereby securing end gate 30 in the closed position. Referring to FIG. 3, when cargo box 14 is to be unloaded, a signal is sent from control box 21 to actuator 23 to cause hydraulic mechanism 15 to move toward the extended position, illustrated in FIG. 3. Actuator post 52 becomes disengaged from sensor 50 as cargo box 14 rises toward the unloading position. Referring to FIG. 4, a signal is thereby caused to be sent from switch 56 to solenoids 62, and limiter switch 45 actuates movement of rams 66 to move pivoting hooks 44 to the open position, illustrated in FIGS. 3 and 7. Pivoting hooks 44 move to the release position disengaged from pins 40, as illustrated in FIG. 7. End gate 30 is then not secured by pivoting hooks 44, and is free to move about second pivots 38 to the open position under the force of gravity as cargo box 14 rises. A load in cargo box 14 is then free to slide from cargo box 14 through open unloading end 24.

Third override setting of control box 21 enables an operator to override the signal from switch 56 that causes automatic movement of pivoting hooks 44 to the open position. The operator can thereby move cargo box 14 to the unloading position without moving pivoting hooks 44 to the open position, maintaining end gate 30 in the closed position.

It will be apparent to one skilled in the art that modifications may be made to the illustrated embodiment without departing from the spirit and scope of the invention as hereinafter defined in the Claims.

The Embodiments of the invention in which an exclusive property or privilege is claimed are defined as follows:

1. A dump truck end gate locking system, comprising in combination:

a dump truck having a chassis and a cargo box pivotally mounted to the chassis for pivotal movement about a first substantially horizontal pivot axis between a substantially horizontal transport position and an inclined dumping position, the cargo box having an end gate pivotally mounted for pivotal movement about a second substantially horizontal pivot axis;

a sensor mounted to one of the chassis and the cargo box for sensing when the cargo box is in the transport position;

at least one movable locking member mounted to the cargo box, the at least one movable locking member having a locked position engaging the end gate and an unlocked position disengaged from the end gate;

a drive mechanism for the locking member coupled to the sensor, the drive mechanism moving the at least one locking member to the locked position to secure the end gate when the sensor indicates the cargo box is in the transport position, the drive mechanism moving the at least one locking member to the unlocked position to release the end gate only when the sensor indicates the cargo box has moved from the transport position to assume a dumping position; and a control box receiving signals from the sensor and controlling the drive mechanism, the control box automatically activating the drive mechanism upon receiving signals from the sensor that the cargo box has moved from the transport position, the control box having an override setting that enables an operator to move the cargo box to an unloading position while delaying operation of the drive mechanism to temporarily maintain the end gate in the closed position.

2. The dump truck end gate locking system as defined in claim 1, wherein the at least one movable locking member is a pivoting hook that engages a pin mounted on the end gate.

3. The dump truck end gate locking system as defined in claim 1, wherein the drive mechanism is a ram.

4. The dump truck end gate locking system as defined in claim 1, wherein the sensor is a plunger activated switch.

5. A dump truck end gate locking system, comprising in combination:

- a dump truck having a chassis and a cargo box pivotally mounted to the chassis for pivotal movement about a first substantially horizontal pivot axis between a substantially horizontal transport position and an inclined dumping position, the cargo box having an end gate pivotally mounted for pivotal movement about a second substantially horizontal pivot axis;
- a sensor in the form of a plunger activated switch mounted to the chassis with an upstanding plunger extending above the chassis, the cargo box depressing the plunger when the cargo box is in the transport position;
- a pair of pivoting hooks mounted to opposite sides of the cargo box, the pivoting hooks having a locked position engaging pins mounted on the end gate and an unlocked position disengaged from the pins mounted on the end gate;
- a ram drive mechanism for the pivoting hooks coupled to the sensor, the ram drive mechanism moving the pivoting hooks to the locked position to secure the end gate when the sensor indicates the cargo box is in the transport position, the ram drive mechanism moving the pivoting hooks to the unlocked position to release the end gate only when the sensor indicates the cargo box has moved from the transport position to assume a dumping position; and
- a control box receiving signals from the sensor and controlling the drive mechanism, the control box automatically activating the ram drive mechanism upon receiving signals from the sensor that the cargo box has moved from the transport position, the control box having an override setting that enables an operator to move the cargo box to an unloading position while delaying operation of the ram drive mechanism to temporarily maintain the end gate in the closed position.

* * * * *